UNITED STATES PATENT OFFICE.

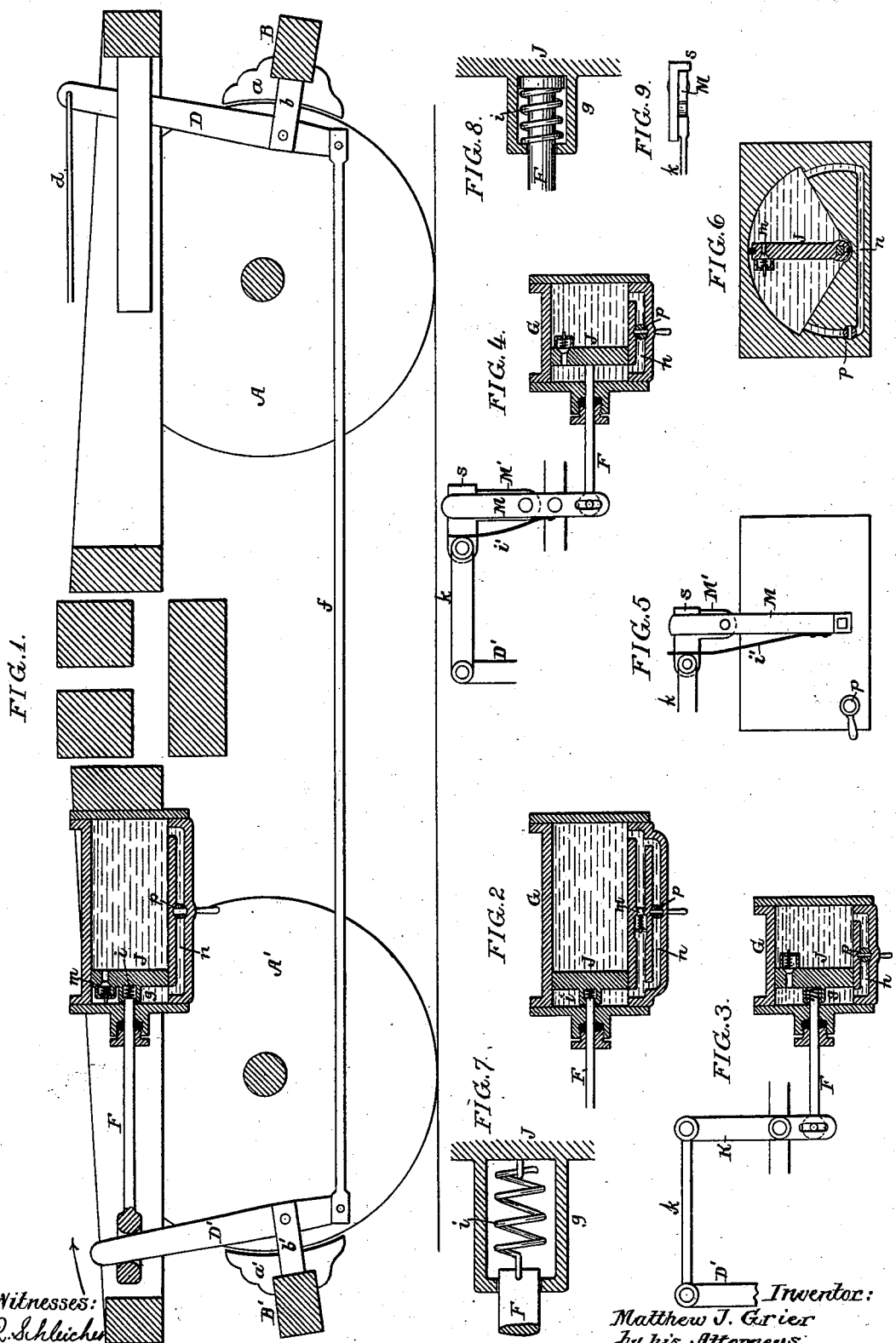

MATTHEW J. GRIER, OF PHILADELPHIA, PENNSYLVANIA.

COMPENSATING DEVICE FOR CAR-BRAKES.

SPECIFICATION forming part of Letters Patent No. 507,654, dated October 31, 1893.

Application filed March 3, 1893. Serial No. 464,546. (No model.)

*To all whom it may concern:*

Be it known that I, MATTHEW J. GRIER, a citizen of the United States, residing in Philadelphia, Pennsylvania, have invented certain Improvements in Compensating Devices for Railway-Car-Brake Mechanism, of which the following is a specification.

The object of my invention is to provide simple and efficient means whereby any slack in the braking gear due to wearing of the shoes or looseness of fit of any other portions of the gear may be automatically taken up or compensated for and the brake shoes thereby normally held in such relation to the wheels that they can be applied to the latter with a minimum amount of movement of the brake operating device whether the same be actuated by hand or power.

My invention consists mainly in effecting a change in the position of the fulcrum of the compensating lever, as soon as such change is permitted by reason of undue wear or looseness of parts of the brake gear, this change being caused by the passage of a volume of liquid from one side to the other of a piston or plunger contained in a suitable cylinder or casing, and free to move therein in but one direction, so that successive movements of advance in the position of the fulcrum of the compensating lever are maintained. My improved form of retainer may also, if desired, be used as a substitute for the rack and pawl or interlocking racks in various forms of compensating devices which have heretofore been devised.

The invention also comprises simple means whereby the compensating lever can be restored to its original position when new shoes are applied to the brakes and it further comprises means for obviating any shock or jar in the operation of the compensating device and for preventing the locking of the brake shoes in contact with the wheels.

In the accompanying drawings:—Figure 1, is a diagram illustrating one form of my improved compensating device for railway car brake mechanism. Figs. 2, 3, 4, 5 and 6, are diagrams illustrating different embodiments of my invention. Fig. 7, is an enlarged view of a spring connection forming part of the construction shown in Figs. 1 and 2. Fig. 8, is an enlarged view of a spring connection such as is employed in the construction shown in Fig. 3; and Fig. 9, is an enlarged plan view of the duplex lever shown in Figs. 4 and 5.

In Fig. 1, A A' represent the two wheels at one side of a car truck, and B B' the two brake beams suspended from the truck as usual, and carrying the brake shoes a a' respectively, the shoe a acting on the wheel A, and the shoe a' acting on the wheel A'.

Hung to a bracket b on the brake beam B is what is known as the "live" lever D of the brake gear, the long arm of this lever being connected by a rod d to the brake operating device, and the short arm of the lever being connected by a rod f to the short arm of a lever D' which is known as the "dead" lever and is hung to a bracket b' on the brake beam B'. Slackness in the brake gear caused by looseness or wear of the shoes or other parts of the gear may be compensated for by the movement of the upper end of the dead lever in the direction of the arrow, and various devices have been patented for retaining said upper end of the dead lever in the successive positions of advancement which it assumes, or is caused to assume, by reason of the slack in the braking gear; hence, for convenience, I have illustrated my invention as used in connection with the dead lever, although it is applicable to any other form of the braking gear which is intended in like manner to serve as a compensating lever.

As shown in Fig. 1, the upper end of the dead lever is adapted to a slot in the enlarged end of a rod F which passes through a stuffing box at one end of a cylinder G mounted in any suitable way upon the car truck or framing, the inner end of this rod acting upon a piston or plunger J which fits snugly to the bore of the cylinder. By preference, the rod F is not rigidly connected to the piston J, but fits within a socket g on said piston, a spring i being interposed between and connected to the piston and the inner end of the rod, as shown in Fig. 7, so that on the inward movement of the rod, no motion will be communicated to the piston until this spring is first compressed, and a slight outward movement of the rod, without corresponding movement of the piston is permitted. The cylinder is filled with liquid of any desired character preferably one which has a very low freezing point, so that the operation of the device will not be interfered with by low temperature. The piston J has formed through it an opening to which is adapted a valve m which, when the piston is moved inward, opens and permits a flow of liquid from one side of the piston to the other, but which closes and prevents any movement of the piston in the opposite direction. It will therefore be seen that if there is any movement of the upper end of the dead lever in the direction of the arrow, of sufficient extent to cause a movement of the piston J in the same direction, this latter movement will be held, owing to the inability of the piston J to return to its former position; hence any forward movements of the upper or fulcrum end of the dead lever which may be caused either by power applied to the said dead lever or by the shaking movement of the lever itself due to the movement of the car, will be maintained and excessive slack in any part of the braking gear will thus be prevented. After every forward movement of the upper end of the lever D' sufficient to cause any advance in the position of the piston J, said lever D' will be retracted to a certain extent by the falling or drawing of the brake shoes away from the wheels, such movement being assisted by the action of the spring i; hence the dead lever always possesses such an amount of freedom of movement that the accidental locking of the brake shoes against the treads of the wheels is effectually prevented.

In order that the lever D' may be restored to its original position when necessary, as for instance, when it is desired to apply new shoes to the brakes, I provide the cylinder G with a by-pass pipe or passage n having a valve p which, when opened, will permit the free flow of liquid from one end of the cylinder to the other, and will thus permit the piston to move within the cylinder in either direction.

In that form of my invention which is shown in Fig. 2, the check valve, instead of being carried by the piston, is located in a passage which forms a communication between the opposite ends of the cylinder, the by-pass communicating with this passage on opposite sides of the valve.

In Fig. 3 I have shown a construction in which the movement of the lever D' is transmitted to the piston J through the medium of an interposed lever K, one arm of which is connected to the upper end of the lever D' by means of a link k, the other arm of the lever having a slotted connection with the piston rod F. By making one arm of the lever K longer than the other, a shorter cylinder can be employed than in cases such as shown in Figs. 1 and 2, where the movement of the upper end of the lever D' is transmitted directly to the piston. Owing to the interposition of the lever K, moreover, the compensating movement of the piston J in the construction shown in Fig. 3 is the reverse of that in the construction shown in Figs. 1 and 2; hence the spring i is also adapted to act in the reverse direction, as shown more clearly in Fig. 8.

In the construction shown in Fig. 4, a duplex or compound lever M M' is used in place of the lever K (Fig. 3) the lever M' being hung to the lever M, but having a certain amount of movement independently thereof, this independent movement being limited in one direction by contact of a lug s on the lever M' with the lever M, and in the other direction by the compression of a spring i' mounted upon the lever M and acting upon the lever M' so as to serve to keep the projection s normally in contact with said lever M. In this case the piston rod F is rigidly connected to the piston J, but any forward movement of the upper end of the lever D must first move the lever M' and compress the spring i' before imparting any movement to the lever M or to the piston rod connected thereto, and the spring i' provides for such free movement of the lever D' as will insure the dropping of the brake shoes free from contact with the treads of the wheels in the same manner as the spring i which is employed in connection with the devices shown in Figs. 1, 2 and 3.

In Figs. 5 and 6 I have shown a construction in which a vibrating piston adapted to move to and fro in a segmental chamber is employed in place of the piston reciprocating in a cylinder, as in the devices previously described, the opposite ends of this segmental chamber being connected by a valved by-pass and the piston carrying a check valve which prevents movement of the same in one direction. This construction also provides for the connection of the lever M directly to the spindle of the piston J.

Having thus described my invention, I claim and desire to secure by Letters Patent—

1. The within described device for compensating for wear or looseness of parts of car brake mechanism, said compensating device comprising a cylinder or casing having a liquid chamber, a piston or plunger contained in said chamber, and a valve whereby liquid is permitted to flow from one side of the piston to the other, but is prevented from returning, substantially as specified.

2. As a means of retaining in its successive positions of advancement a compensating lever of railway car brake mechanism, the combination of a cylinder or casing having a liquid chamber containing a piston or plunger connected to said compensating lever, and a valve whereby the liquid is permitted to flow from one side of said piston to the other but is prevented from returning, substantially as specified.

3. As a means of retaining in its successive positions of advancement a compensating lever of railway car brake mechanism, the combination of a cylinder or casing having a liquid chamber, a piston or plunger contained in said chamber, a valve whereby liquid is permitted to flow from one side of the piston to the other but is prevented from returning, and a connection between said piston and the compensating lever, one of the elements of said connection being a spring, whereby a certain amount of movement of the compensating lever independently of the piston is permitted, substantially as specified.

4. As a means of retaining in its successive positions of advancement a compensating lever of railway car brake mechanism, the combination of a cylinder or casing containing a liquid chamber, a piston or plunger contained in said chamber, a valve whereby liquid is permitted to flow from one side of said piston or plunger to the other but is prevented from returning, and a lever, one arm of which is connected to the rod of said piston or plunger, and the other to the compensating lever, substantially as specified.

5. As a means of retaining in its successive positions of advancement a compensating lever of railway car brake mechanism, the combination of a cylinder or casing containing a liquid chamber, a piston or plunger contained in said chamber, a valve whereby the liquid is permitted to flow from one side of said piston to the other but is prevented from returning, and a connection between said piston and the compensating lever, one of the elements of said connection being a duplex lever, one part of which is connected to the piston rod, the other part being connected to the compensating lever and being capable of a limited amount of movement independently of the first, substantially as specified.

6. As a means of retaining in its successive positions of advancement a compensating lever of railway car brake mechanism, the combination of a cylinder or casing containing a liquid chamber, a piston or plunger contained in said chamber, a valve whereby liquid is permitted to flow from one side of the piston to the other but is prevented from returning, a connection between said piston and the compensating lever, said connection having as one of its elements a duplex lever, one part of which is connected to the piston rod, the other part being capable of slight movement independently of the first and being connected to the compensating lever, and a spring interposed between the two parts of said duplex lever, substantially as specified.

7. The combination of a compensating lever of railway car brake mechanism, with a cylinder or casing containing a liquid chamber, a piston contained in said chamber and connected to said compensating lever, a valve whereby the liquid is permitted to flow from one side of said piston to the other but is prevented from returning, and a valved by-pass whereby communication may be opened between portions of the liquid chamber on opposite sides of the piston, substantially as specified.

In testimony whereof I have signed my name to this specification in the presence of two subscribing witnesses.

MATTHEW J. GRIER.

Witnesses:
 FRANK E. BECHTOLD,
 JOSEPH H. KLEIN.